(12) United States Patent
Bragg et al.

(10) Patent No.: US 11,476,623 B2
(45) Date of Patent: Oct. 18, 2022

(54) STAGGERED CONTACT

(71) Applicant: Leviton Manufacturing Co., Inc., Melville, NY (US)

(72) Inventors: Charles R Bragg, Bothell, WA (US); Ross Goldman, Bothell, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 57 days.

(21) Appl. No.: 17/090,335

(22) Filed: Nov. 5, 2020

(65) Prior Publication Data
US 2022/0140548 A1 May 5, 2022

(51) Int. Cl.
*H01R 24/64* (2011.01)
*H01R 31/00* (2006.01)
*H01R 13/502* (2006.01)
*G06F 1/26* (2006.01)
*H01R 13/66* (2006.01)

(52) U.S. Cl.
CPC ............ *H01R 24/64* (2013.01); *G06F 1/266* (2013.01); *H01R 13/502* (2013.01); *H01R 13/66* (2013.01); *H01R 31/005* (2013.01); *H01R 2201/04* (2013.01)

(58) Field of Classification Search
CPC ...... H01R 24/64; H01R 13/502; H01R 13/66; H01R 31/005
USPC ........................................................ 439/676
See application file for complete search history.

(56) References Cited

U.S. PATENT DOCUMENTS

| | | | | | |
|---|---|---|---|---|---|
| 4,607,907 | A | * | 8/1986 | Bogursky | H01R 12/82 439/856 |
| 4,795,379 | A | * | 1/1989 | Sasaki | H01R 13/11 439/856 |
| 4,952,178 | A | * | 8/1990 | Beer | H01R 13/114 439/856 |
| 4,973,273 | A | * | 11/1990 | DePriest | H01R 13/11 439/856 |
| 5,167,544 | A | * | 12/1992 | Brinkman | H01R 13/11 D13/133 |

(Continued)

FOREIGN PATENT DOCUMENTS

| | | |
|---|---|---|
| CN | 101689736 B | 6/2013 |
| TW | M466396 U | 11/2013 |
| WO | 2016093993 A1 | 6/2016 |

OTHER PUBLICATIONS

International Search Report and Written Opinion received for PCT Application Serial No. PCT/US2021/07899, dated Jan. 31, 2022, 5 pages.

*Primary Examiner* — Alexander Gilman
(74) *Attorney, Agent, or Firm* — Amin, Turocy & Watson, LLP

(57) ABSTRACT

An electrical contact suitable for use within data connectivity applications in which both power and data are conveyed over the same pair of conductors is configured with a staggered profile geometry that isolates the location of high-current disconnects while maintaining a surface that remains free of electrical arcing and erosion. The electrical contact is designed with two points of contact, and the staggered geometry ensures that only one of the two points of contact is exposed to electrical arcing when the connector is disconnected while under power, thereby protecting the other point of contact from arc-related surface damage.

20 Claims, 3 Drawing Sheets

(56) References Cited

U.S. PATENT DOCUMENTS

| | | | | |
|---|---|---|---|---|
| 5,281,175 A * | 1/1994 | Chupak | H01R 13/113 | 439/852 |
| 5,458,513 A * | 10/1995 | Matsuoka | H01R 13/112 | 439/857 |
| 5,582,519 A | 12/1996 | Buchter | | |
| 5,672,084 A * | 9/1997 | Feldman | H01R 13/11 | 439/852 |
| 5,688,143 A * | 11/1997 | McHugh | H01R 12/79 | 439/495 |
| 6,116,926 A * | 9/2000 | Ortega | H01R 13/6471 | 439/857 |
| 6,217,356 B1 * | 4/2001 | Davis | H01R 4/245 | 439/856 |
| 6,238,238 B1 * | 5/2001 | Hwang | H01R 12/79 | 439/495 |
| 6,276,958 B1 * | 8/2001 | Chih | H01R 12/79 | 439/495 |
| 6,375,488 B1 * | 4/2002 | Noro | H01R 12/592 | 439/857 |
| 6,488,549 B1 | 12/2002 | Weller et al. | | |
| 6,932,642 B2 * | 8/2005 | Beer | H01R 12/79 | 439/495 |
| 7,090,534 B2 * | 8/2006 | Wu | H01R 13/502 | 439/607.41 |
| 7,341,487 B2 * | 3/2008 | Wu | H01R 13/6592 | 439/607.41 |
| 7,462,071 B1 * | 12/2008 | Wu | H01R 13/6589 | 439/607.05 |
| 7,632,155 B1 * | 12/2009 | Wu | H01R 13/6471 | 439/497 |
| 7,789,708 B2 | 9/2010 | Laurx et al. | | |
| 8,398,427 B2 * | 3/2013 | Wu | H01R 4/02 | 439/497 |
| 8,714,994 B2 * | 5/2014 | Daily | H01R 24/64 | 439/344 |
| 8,777,664 B2 * | 7/2014 | Gui | H01R 13/6471 | 439/607.25 |
| 8,784,134 B2 * | 7/2014 | Wu | H01R 13/6464 | 439/607.05 |
| 8,894,441 B2 * | 11/2014 | Wu | H01R 13/6471 | 439/660 |
| 8,979,574 B2 * | 3/2015 | Daily, Jr. | H01R 4/2433 | 439/676 |
| 9,231,314 B2 * | 1/2016 | Peterson | H01R 4/24 | |
| 9,377,794 B1 * | 6/2016 | Dwelley | G05F 1/462 | |
| 9,620,910 B2 * | 4/2017 | Chen | H01R 13/6658 | |
| 9,673,542 B1 * | 6/2017 | Decker | H01R 12/57 | |
| 9,972,932 B2 | 5/2018 | Copper et al. | | |
| 10,103,465 B2 * | 10/2018 | Amini | H01R 12/73 | |
| 10,418,763 B2 * | 9/2019 | Tziviskos | H01R 24/64 | |
| 10,453,589 B1 * | 10/2019 | Conaty | H01B 13/0036 | |
| 10,658,778 B2 * | 5/2020 | Hanyu | H01R 13/113 | |
| 10,700,455 B1 * | 6/2020 | Shen | H01R 13/502 | |
| 11,081,846 B2 * | 8/2021 | Delpier | H01R 24/60 | |
| 2007/0288125 A1 * | 12/2007 | Quaratiello | H04L 12/10 | 700/282 |
| 2014/0115354 A1 * | 4/2014 | Jabbaz | H04L 12/10 | 713/310 |
| 2015/0340818 A1 * | 11/2015 | Scherer | H01R 13/70 | 29/33 M |
| 2016/0072200 A1 * | 3/2016 | Sabo | H01R 4/2466 | 439/395 |
| 2018/0048082 A1 * | 2/2018 | Sabo | H01R 12/716 | |
| 2019/0312439 A1 * | 10/2019 | Cottrell | H02J 3/46 | |
| 2020/0153174 A1 * | 5/2020 | Curtis | H01R 13/6272 | |
| 2020/0227843 A1 * | 7/2020 | Watkins | H01R 13/622 | |
| 2020/0382338 A1 * | 12/2020 | Siergiej | H04L 12/10 | |
| 2021/0242623 A1 * | 8/2021 | Patel | H01R 24/64 | |
| 2021/0280996 A1 * | 9/2021 | Liu | H05K 1/117 | |
| 2021/0336653 A1 * | 10/2021 | Klein | H04L 12/40045 | |
| 2021/0391653 A1 * | 12/2021 | Berg | H04B 3/54 | |

* cited by examiner

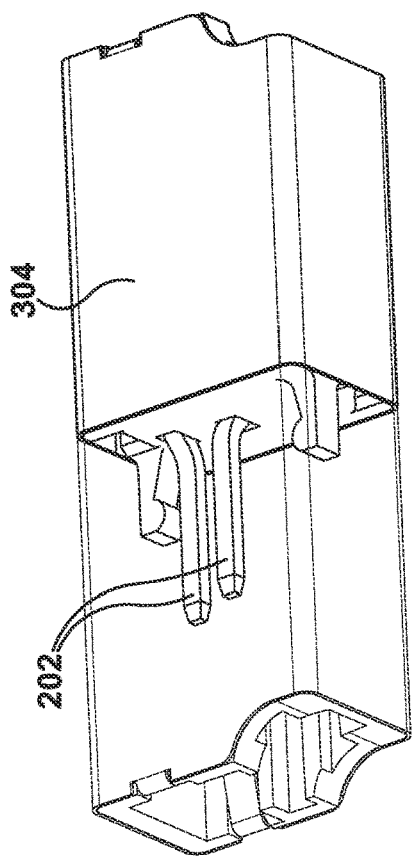 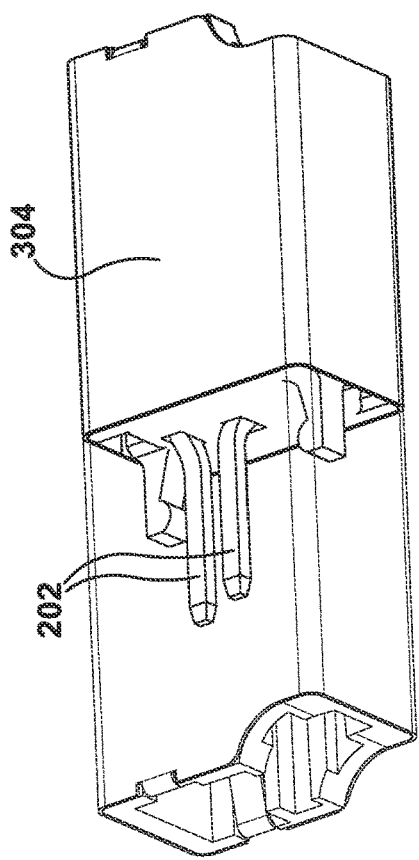
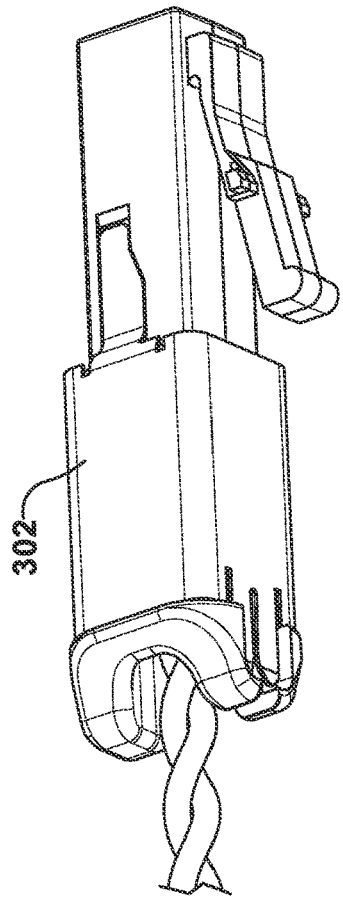 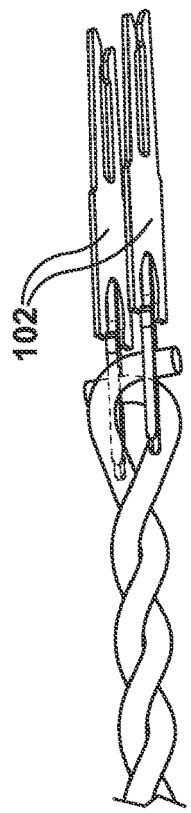
FIG. 3A
FIG. 3B

STAGGERED CONTACT

TECHNICAL FIELD

The disclosed subject matter relates generally to network and data connectors.

BACKGROUND

Some network architectures utilize power over data line (PoDL) technology to provide both data and power through a single pair of wires (e.g., a twisted pair). Similar to power-over-Ethernet (PoE), PoDL architectures convey power over the same cable conductors used to transport data between endpoint devices that are interfaced with the PoDL network. Power delivered via PoDL can be sourced by a switch or another type of power source. In contrast to PoE, which uses two or more pairs of wires to propagate power and data, PoDL requires only one pair of wires and can therefore be used to convey data and power to and from devices that support single-pair data connectivity, such as single-pair Ethernet devices.

When a network connector is disconnected from a port or another network connector while power is present on the connector's electrical contacts, as in the case of PoDL, electrical arcing can occur between the conductive tines or contacts of the connector and its mating port or connector. Over time, erosion on the tines' surfaces caused by this arcing can degrade the reliability of the electrical connection between the tines or contacts.

The above-described deficiencies of PoDL electrical connectors are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein relate to a staggered electrical contact for use in PoDL network connectors, or in connectors that support other network protocols in which power is conveyed through the electrical contacts of the connectors. The staggered profile of the electrical contact described herein yields two contact points which make contact with a mating tine of another connector or port while engaged. When the connector is disengaged, one of these two contact points disconnects from the mating tine before the other of the two contact points, ensuring that the first contact point sustains no electrical arcing during disconnect. As a result, the staggered contact maintains at least one contact point that is not affected by electrical erosion and thus ensures reliable electrical contact over time.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 3a is a perspective view of an example female PoDL connector and a corresponding male PoDL connector in which staggered electrical contacts are used.

FIG. 3b is another perspective view of the female PoDL connector and male PoDL connector with the housing of the male connector omitted to provide a view of the staggered electrical contacts.

DETAILED DESCRIPTION

Figure 1A:
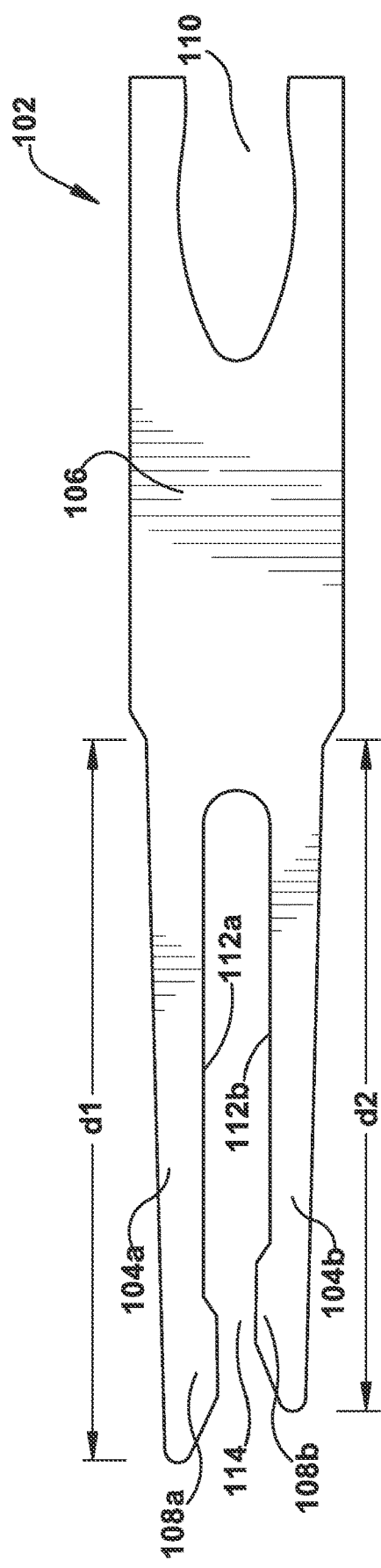
FIG. 1a is a side view of a staggered electrical contact for use in an electrical connector.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Some reference numbers used herein to label illustrated components are suffixed with letters to delineate different instances of a same or similar component. In general, if a reference number without an appended letter is used within this disclosure, the descriptions ascribed to the reference number are to be understood to be applicable to all instances of that reference number with or without an appended letter unless described otherwise.

While a network connector is connected to a port or another network connector over which both data and power are conveyed, the conductive tines or contacts within the network connector maintain electrical contact with the corresponding contacts or tines of the mating data port or connector. Since current may be flowing through the tines at the moment the network connector is subsequently disconnected from the mating data port or connector, inductive elements in the conductive channels can cause an electrical arc to discharge at the point of final disconnection between the two conductive tines at the moment when the connectors are disconnected. Over time, this repeated electrical arcing at or near the same locations on the tines can damage the tines' surfaces at the point of disconnect, eroding the conductive surfaces of the tines. This erosion can degrade the reliability of the electrical connection between the two tines or contacts.

To address these and other issues, one or more embodiments described herein provide a staggered electrical contact that can be used within a network connector or port. The profile geometry of the staggered electrical contact isolates the location of high-current disconnects while providing a surface that remains free of electrical arcing and erosion.

Figure 1B:
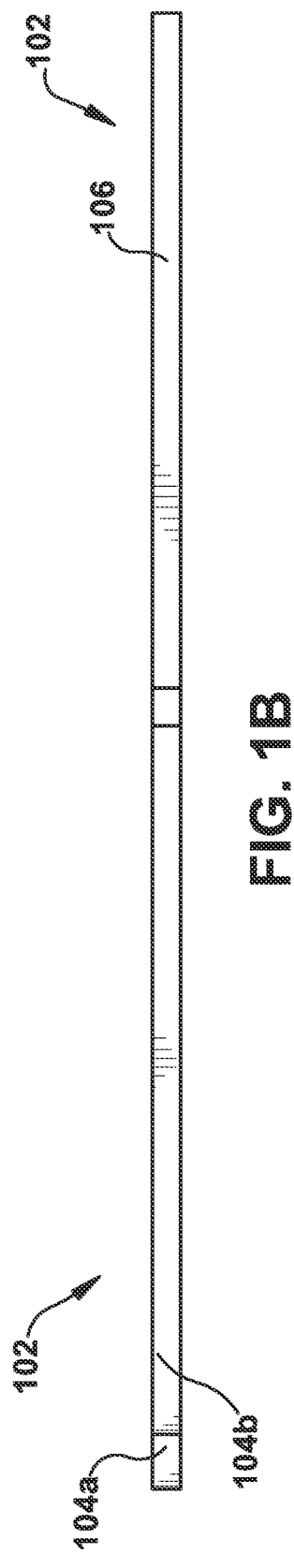
FIG. 1b is a bottom view of the staggered electrical contact.

FIG. 1a is a side view of a staggered electrical contact 102 for use in an electrical connector, such as a PoDL connector or another type of network connector used in networking applications in which both power and data are conveyed over the same cable wires. FIG. 1b is a bottom view of the staggered electrical contact 102. Staggered electrical contact 102 has a geometry comprising an electrically conductive base 106 and two electrically conductive arms 104a and 104b that extend laterally from the base 106. Arms 104a and 104b extend in the same direction from the base 106 and define a gap 114 between the two arms 104a and 104b. The gap 114 is configured to receive a corresponding electrical contact or tine of a mating connector or port. In some embodiments, a notch 110 or another type of structure can be formed on the side of the base 106 opposite the arms 104a, 104b. This notch 110 can be used to electrically interface the contact 102 with a corresponding wire within the connector in which the contact 102 resides (e.g., by soldering the wire within the notch 110).

In the illustrated example, each arm 104a, 104b also comprises a raised section 108a, 108b formed on the end of its corresponding arm 104a, 104b. These raised sections 108a and 108b are formed on the inside edges 112a and 112b of their respective arms 104a and 104b (e.g., the facing edges of the arms 104b and 104b), such that the raised sections 108a and 108b face each other across the gap 114. Raised sections 108a and 108b act as respective two points of contact between electrical contact 102 and a mating electrical contact or tine.

Arms 104a and 104b are formed to have two different lengths, yielding a staggered contact profile. That is, a length d1 of the first arm 104a is greater than the length d2 of the second arm 104b. This causes the raised sections 108a and 108b to be laterally offset from one another, or staggered. This staggering of the raised sections 108a and 108b ensures that one of the two points of contact will not be exposed to electrical arcing upon disconnect from the mating contact, thereby maintaining at least one point of contact that remains free of arc-induced erosion and pitting.

Figure 2:
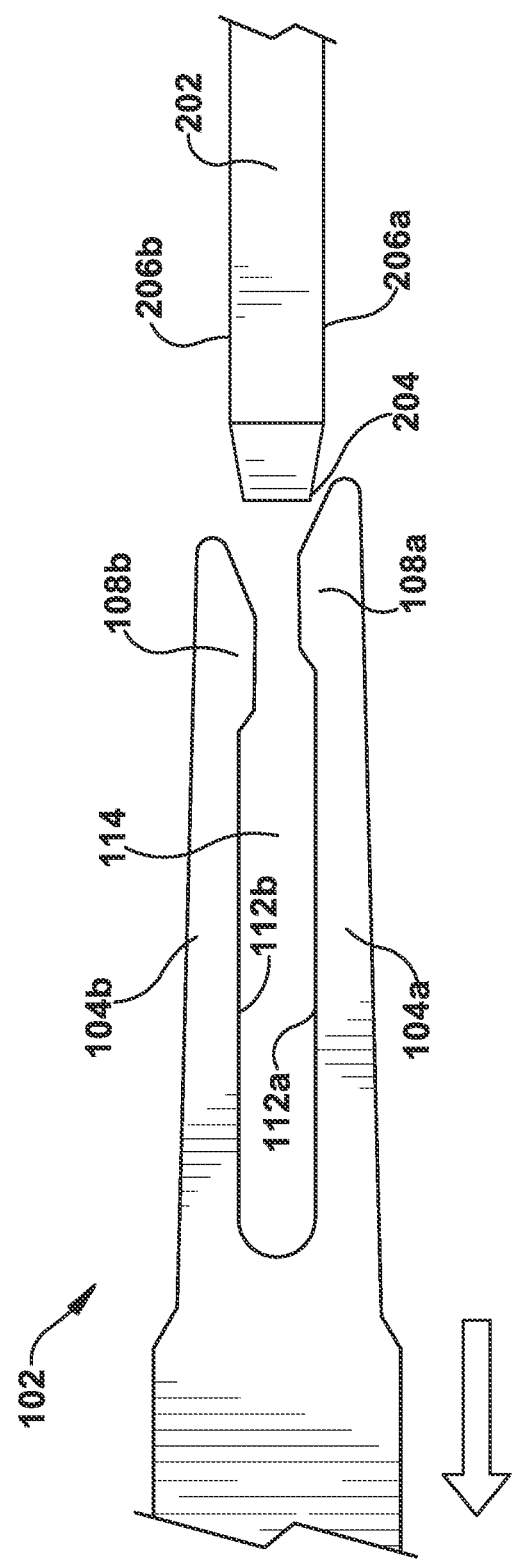
FIG. 2 is a side view of the staggered electrical contact in alignment with a mating contact.

FIG. 2 is a side view of the staggered electrical contact 102 in alignment with a mating contact 202. In an example scenario, staggered electrical contact 102 can be one of two or more contacts of a first network connector (omitted from FIG. 2 for clarity) that supports PoDL or another networking protocol, while mating contact 202 can be one of two or more corresponding contacts of a data port or a second network connector (also omitted from FIG. 2) with which the first network connector interfaces. As shown in FIG. 2, the mating contact 202 comprises a single flat tine. When the staggered electrical contact 102 is engaged with the mating contact 202 (e.g., when the first network connector is plugged into the data port or second network connector), the mating contact 202 resides within gap 114 between the two arms 104a and 104b of the staggered electrical contact 102, and the staggered electrical contact 102 makes contact with the mating contact 202 at two points corresponding to the inner edges of raised sections 108a and 108b. Since mating contact 202 resides in the gap 114 between the two arms 104a and 104b, one raised section 108a contacts a first side 206a of mating contact 202, while the other raised section 108b contacts a second side 206b of mating contact 202 opposite the first side 206a. Power and data can thus pass across the mated contacts 102 and 202 via these two points of contact.

When the contacts 102 and 202 are disengaged by displacing the staggered electrical contact 102 in the direction of the arrow depicted in FIG. 2 (e.g., when the first network connector is unplugged from the data port or second network connector), the lateral staggering of arms 104a and 104b causes the two points of contact corresponding to raised sections 108a and 108b to separate from the mating contact 202 at two different times. Specifically, as the staggered electrical contact 102 is being disengaged from the mating contact 202, the raised section 108b of the shorter arm 104b separates from the mating contact 202 before the raised section 108a of the longer arm 104a. Since raised section 108a maintains contact with the mating contact 202 at the moment raised section 108b separates from the mating contact 202, electrical connectivity between the staggered electrical contact 102 and the mating contact 202 is maintained. Consequently, even if current is flowing through the contacts 102 and 202 at the moment raised section 108b separates from mating contact 202, there is no electrical discharge or arcing between raised section 108b and the mating contact 202.

As the staggered electrical contact 202 continues to disengage from the mating contact 202, the point of contact 204 corresponding to raised section 108a is the last point on the staggered electrical contact 202 to separate from the mating contact 202. While there may an electrical discharge or arc at this point of contact 204 if current is flowing through the contacts 102 and 202 at the moment of separation, any surface damage to the staggered electrical contact 202 as a result of this arcing is limited to this raised section 108a, leaving the other raised section 108b free of arc-related damage. As a result, the point of contact 204 corresponding to the raised section 108a of the longer arm 104a sustains all arc-related damage, while the other point of contact corresponding to the raised section 108b of the shorter arm 104b remains undamaged. This ensures that staggered electrical contact 102 maintains at least one reliable point of contact that sustains no surface damage or pitting due to electrical discharge on disconnect.

Staggered electrical contacts 102 can be used in substantially any type of data or network connector, and offer particular benefits for applications in which both power and data are conveyed over the same electrical conductors (e.g., PoDL). FIG. 3a is a perspective view of an example female PoDL connector 304 and a corresponding male PoDL connector 302 in which staggered electrical contacts 102 are used. FIG. 3b is another perspective view of the female PoDL connector 304 and male PoDL connector 103 in which the housing of the male connector 302 is omitted to provide a view of the staggered electrical contacts 102. Since the illustrated PoDL example uses only a single pair of conductors (e.g., a twisted pair) to convey data and power, connectors 302 and 304 each comprise a single pair of contacts. Specifically, a pair of staggered electrical contacts 102 are housed within the male PoDL connector 302, while a corresponding pair of flat mating contacts 202 are housed within the female PoDL connector 304. When the male PoDL connector 302 is plugged into the female PoDL connector 304, the pair of staggered electrical contacts 102 engage with the corresponding pair of mating contacts 202 in the manner described above in connection with FIG. 2. If connector 302 is unplugged from connector 304 while current is flowing through the contacts 102 and 202, the offset arrangement of the raised sections 108a, 108b on each of the staggered electrical contacts 102 ensures that any electrical discharge or arcing is directed only to one of the raised sections (108*a*) of each contact, while the other raised section (108*b*) is not exposed to arcing and thus incurs no surface damage.

Although the staggered electrical contact 102 has been described above as being used within example PoDL applications, it is to be appreciated that the staggered electrical contacts 102 can also be used in other types of networking applications and protocols, including but not limited to power-over-Ethernet (PoE).

By isolating one of the two points of contact from the electrical arcing that is sometimes induced when the contact 102 is disconnected while under power, the staggered design of electrical contact 102 ensures that the contact 102 maintains at least one point of contact that is free of arc-related surface damage and thus maintains reliable electrical connectivity.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. An electrical contact, comprising:
    a base section;
    a first arm that extends from the base section; and
    a second arm that extends from the base section in a same direction as the first arm,
    wherein
    the electrical contact has a planar profile,
    the first arm and the second arm define a gap configured to receive a mating electrical contact,
    a first raised section and a second raised section are formed on facing edges of the first arm and the second arm, respectively,
    the first raised section and the second raised section are formed on ends of the first arm and the second arm, respectively, and
    a first length of the first arm is greater than a second length of the second arm.

2. The electrical contact of claim 1, wherein the first raised section and the second raised section are configured to make contact with the mating electrical contact while the electrical contact is engaged with the mating electrical contact.

3. The electrical contact of claim 2, wherein, as the electrical contact is disengaged from the mating electrical contact, the second raised section separates from the mating electrical contact before the first raised section separates from the mating electrical contact.

4. The electrical contact of claim 2, wherein
    the first raised section makes contact with a first side of the mating electrical contact while the electrical contact is engaged with the mating electrical contact, and
    the second raised section makes contact with a second side of the mating electrical contact while the electrical contact is engaged with the mating electrical contact.

5. The electrical contact of claim 1, wherein the electrical contact is one of at least two electrical contacts of a network connector.

6. The electrical contact of claim 5, wherein the network connector is configured to convey, via the at least two electrical contacts, power and data signals to a mating network connector in which the mating electrical contact is mounted.

7. The electrical contact of claim 5, wherein the network connector is a data over power link (PoDL) connector or a power-over-Ethernet (PoE) connector.

8. An electrical connector, comprising:
    a connector housing; and
    an electrical contact mounted within the contact housing and configured to engage with a corresponding mating electrical contact of another electrical connector or port, wherein the electrical contact comprises:
    a first arm that extends from a base section of the electrical contact; and
    a second arm that extends from the base section in a same direction as the first arm,
    wherein
    the electrical contact has a planar construction;
    the first arm and the second arm define a gap configured to receive the mating electrical contact while the electrical connector is engaged with the other electrical connector or port,
    the first arm and the second arm comprise a first raised section and a second raised section formed on facing edges of the first arm and second arm, respectively,
    the first raised section and the second raised section are formed on ends of the first arm and second arm, respectively, and
    a first length of the first arm is greater than a second length of the second arm.

9. The electrical connector of claim 8, wherein
    the first raised section and the second raised section are configured to make electrical contact with the mating electrical contact while the electrical connector is engaged with the other electrical connector or port.

10. The electrical connector of claim 9, wherein, as the electrical connector is disengaged from the other electrical connector or port, the second raised section loses contact with the mating electrical contact before the first raised section.

11. The electrical connector of claim 9, wherein
the first raised section electrically connects with a first side of the mating electrical contact while the electrical connector is engaged with the other electrical connector or port, and
the second raised section electrically connects with a second side of the mating electrical contact while the electrical connector is engaged with the other electrical connector or port.

12. The electrical connector of claim 8, wherein the electrical contact is one of at least two electrical contacts mounted within the connector housing.

13. The electrical connector of claim 12, wherein the electrical connector is configured to convey, via the at least two electrical contacts, power and data signals to and from the other electrical connector.

14. The electrical connector of claim 12, wherein the electrical connector is at least one of a power over data line (PoDL) connector or a power-over-Ethernet (PoE) connector.

15. A connector for conducting power and data over a single pair of wires, comprising:
a pair of electrical contacts housed within a connector housing, wherein an electrical contact of the pair of electrical contacts comprises:
a base section configured to electrically connect to a cable wire; and
a first arm and a second arm that that extend from the base section in a same direction,
wherein
the electrical contact has a planar profile,
a first raised section and a second raised section are formed on facing edges of the first arm and the second arm, respectively,
the first raised section and the second raised section are formed on ends of the first arm and the second arm, respectively,
the first arm and the second arm have different lengths; and
a gap between the first arm and the second arm is configured to receive a mating electrical contact of another connector or port while the connector is engaged with the other connector or port.

16. The connector of claim 15, wherein
the first raised section and the second raised section are configured to make electrical contact with the mating electrical contact while the connector is engaged with the other connector or port.

17. The connector of claim 16, wherein, as the connector is disconnected from the other connector, the second raised section separates from the mating electrical contact before the first raised section.

18. The connector of claim 16, wherein
the first raised section and the second raised section electrically connect with a first side and a second side, respectively, of the mating electrical contact while the connector is engaged with the other connector or port.

19. The connector of claim 15, wherein the connector is a power over data line (PoDL) connector.

20. The connector of claim 15, wherein the connector is a power-over-Ethernet (PoE) connector.

* * * * *